United States Patent [19]

Lodas et al.

[11] 4,252,997
[45] Feb. 24, 1981

[54] CIRCUIT FOR INTERFACING NON-DIAL TELEPHONE AND AUTOMATIC SWITCH EQUIPMENT

[75] Inventors: Gregory W. Lodas, Panorama City; Dennis M. Stewart, Santa Monica, both of Calif.

[73] Assignee: General Telephone Company of California, Santa Monica, Calif.

[21] Appl. No.: 30,681

[22] Filed: Apr. 16, 1979

[51] Int. Cl.$^3$ .......................................... H04M 11/04
[52] U.S. Cl. .................................................... 179/5 R
[58] Field of Search ........... 179/5 R, 5 P, 2 A, 1 HF; 340/506, 510, 599, 287

[56] References Cited

U.S. PATENT DOCUMENTS 3,748,389  7/1973  Casterline et al. ................... 179/5 R Primary Examiner—Raymond F. Cardillo, Jr.
Assistant Examiner—Joseph A. Popek
Attorney, Agent, or Firm—John F. Lawler

[57] ABSTRACT

A ring-down or non-dial subscriber telephone such as a freeway emergency telephone is connected to automatic electronic switching (EAX) equipment for interconnection with an emergency operator by an interface circuit having a polarity-sensitive full-wave bridge controlling voice connection of the telephone to the operator. Actuation of the bridge is controlled by a current sensitive controller connected in series with the originating loop containing the freeway telephone. The bridge monitors the on-hook and off-hook states of the called telephone and energizes alarm circuitry upon failure of the calling telephone to go on-hook within a predetermined time after the called telephone goes on-hook. The circuit also has a capability of monitoring current flow in the originating loop containing the calling telephone and of energizing a common alarm circuit in the EAX equipment in the absence of such current flow. Circuit elements are also provided for disconnecting the interface circuit from the common alarm system while retaining identification of the calling telephone responsible for the alarm condition.

10 Claims, 7 Drawing Figures

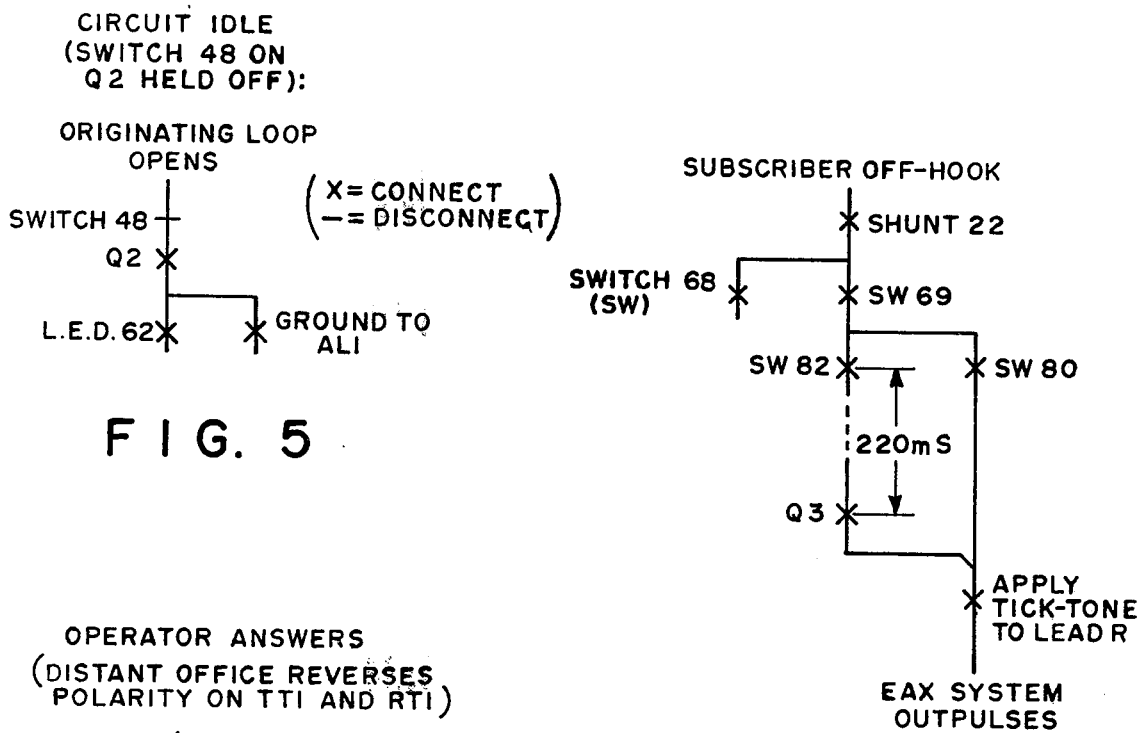
FIG. 5
FIG. 6
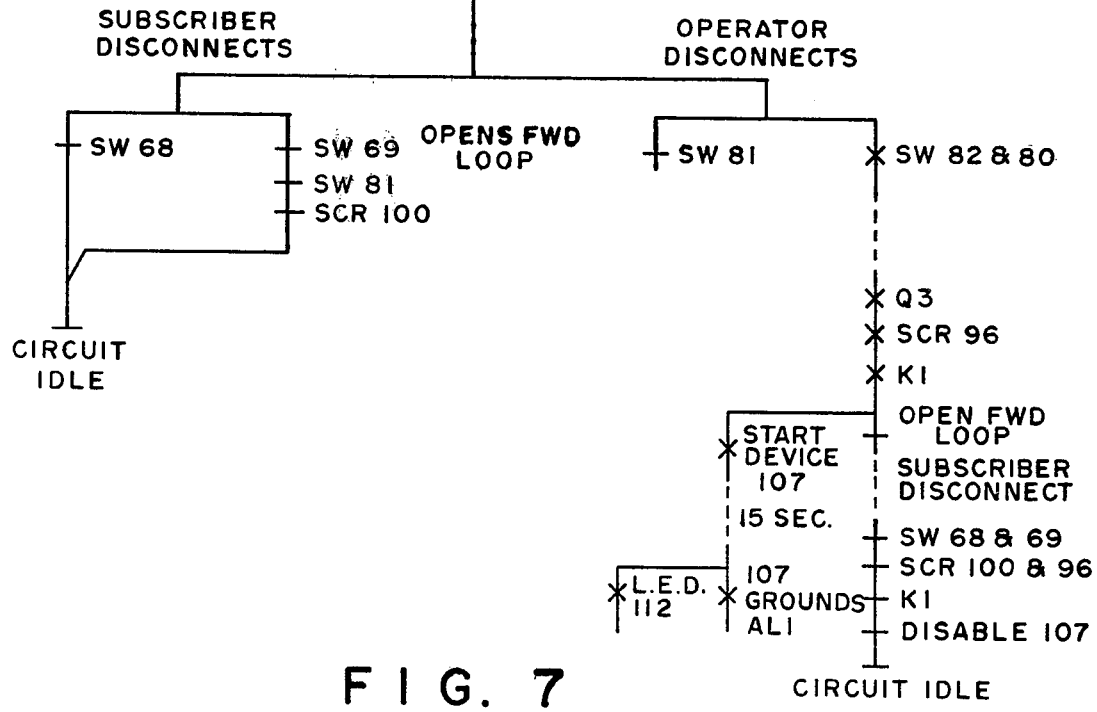
FIG. 7

CIRCUIT FOR INTERFACING NON-DIAL TELEPHONE AND AUTOMATIC SWITCH EQUIPMENT

BACKGROUND OF THE INVENTION

This invention relates to telephone systems and more particularly to non-dial or ring-down telephone connections to emergency operators through automatic electronic switching (EAX) equipment.

In the transition from the use of the mechanical step-by-step (relay) central office switching systems, known as Strowger switches, to EAX equipment in telephone communications systems, it is necessary that field telephones including freeway telephone instruments properly interface with the EAX. The freeway telephone typically is a non-dial instrument connected on dedicated lines to the central office switch which functions to connect it to an emergency operator such as police highway patrol dispatcher. The present method of providing telephone service via the step-by-step system is to cause the interface equipment to outpulse the number to be dialed (emergency operator) into the on-line step-by-step office which in turn translates these signals and reoutpulses the called number. This technique is slow and requires additional bulky equipment to connect the field instrument to the main relay switch which then completes the connection with the emergency operator.

In addition to the above, the relay switching equipment of the prior art monitors the originating call cable facility as well as the freeway telephone instrument for continuity when idle and for a permanent off-hook condition upon operator disconnect. It also activates central office common alarm if the conditions warrants. These features must also be accommodated in the interface circuit for the EAX.

This invention is directed to the provision of such an interface circuit.

OBJECTS AND SUMMARY OF THE INVENTION

A general object of this invention is the provision of an interface circuit for connecting a non-dial telephone instrument such as a freeway telephone or the like to EAX equipment.

A further object is the provision of such an interface circuit having reduced size, cost, maintenance and power requirements as well as increased speed and reliability.

Still another object is the provision of such an interface circuit which is substantially completely solid state.

These and other objects of the invention are achieved with an interface circuit having two separate a-c coupled networks connected to the originating loop of the field telephone and to the forward loop in the EAX, respectively. The forward loop network comprises a full wave bridge actuatable in response to circuit conditions in the originating loop for effecting a-c coupling to that loop and being polarity sensitive for monitoring the forward loop relative to the originating loop and actuating an alarm when field telephone remains off-hook after the emergency operator service ends.

BRIEF DESCRIPTION OF THE DRAWINGS

FIG. 4 is a schematic diagram of an optical isolating switch forming part of the interface circuit; and FIGS. 5, 6 and 7 are functional flow diagrams illustrating the operation of the telephone system embodying the interface circuit of FIG. 3.

DESCRIPTION OF PREFERRED EMBODIMENTS

Figure 1:
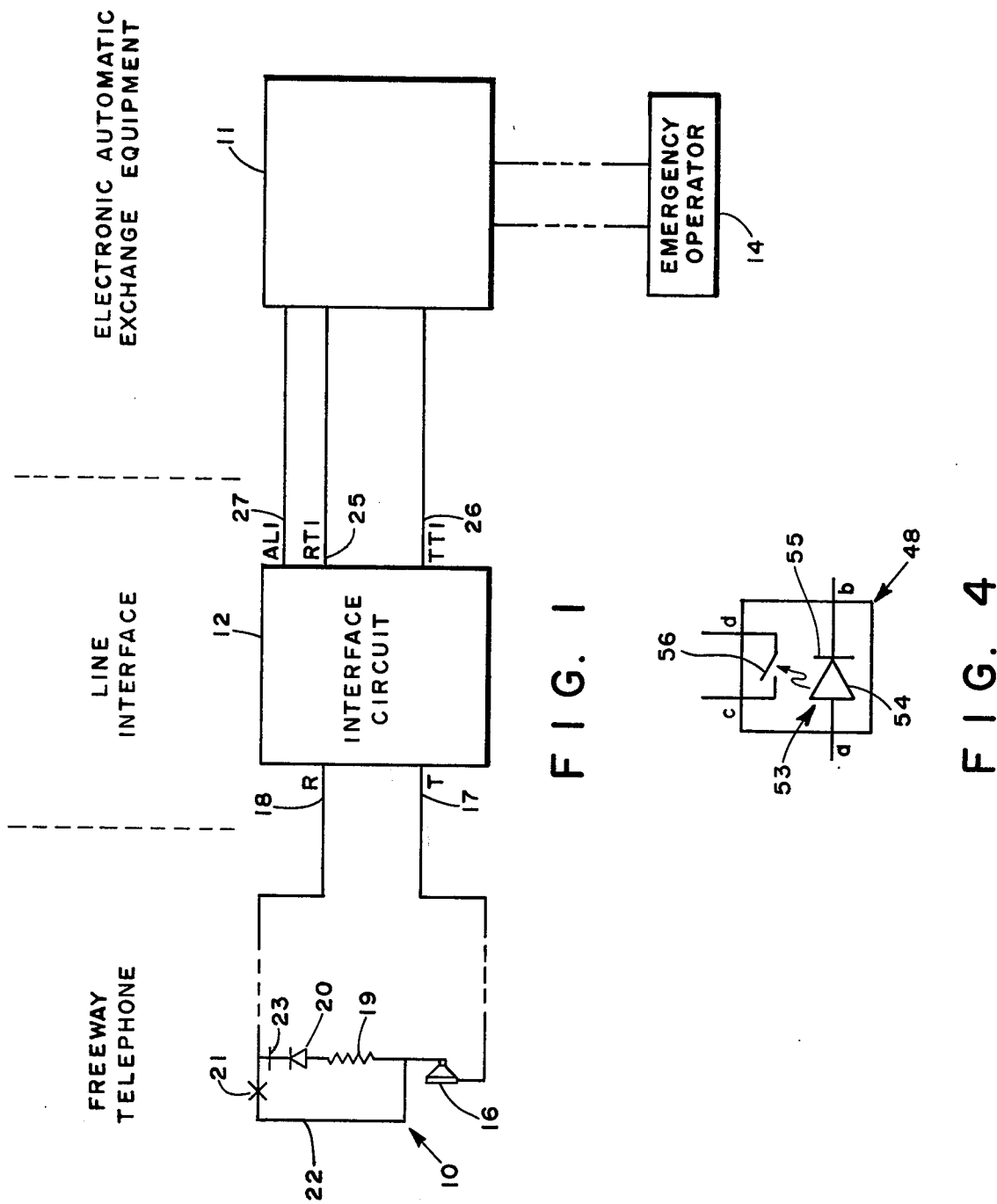
FIG. 1 is a block diagram of a telephone system for use with freeway telephones showing the interface circuit which embodies this invention.

Referring now to the drawings, FIG. 1 illustrates a telephone system comprising a subscriber telephone 10, electronic automatic exchange equipment 11 and a line interface circuit 12 embodying this invention connecting the subscriber telephone to the EAX. EAX 11 is also connectable to many remote telephones including an emergency operator 14 as shown.

For the purpose of illustrating one application of the invention, the subscriber telephone 10 is shown as a freeway emergency telephone that does not have a dial. Telephone 10 includes a transmitter-receiver 16 connected in a series loop with the transmit (T) and receive (R) lines 17 and 18, respectively, of circuit 12 through a resistor 19, a diode 20 and normally closed contact 23 of the telephone hook switch, not shown. A shunt 22 around resistor 19 and diode 20 is connected to line 18 by a normally open contact 21 of the hook switch. When the freeway telephone is on-hook, diode 20 and resistor 19 are in series with the transmitter-receiver 16; when it is off-hook, the diode and resistor are removed by shunt 22 thus lowering the resistance in this call originating loop. Interface circuit 12 is designed to react to the off-hook condition of the freeway telephone and to cause EAX 11 via RT1 line 25 and TT1 line 26 to outpulse the number of emergency operator 14. Lines 17 and 18 as well as lines 25 and 26 are dedicated and there is one interface circuit 12 for each freeway telephone serviced by EAX 11. Line 27, designated AL, interconnects interface circuit 12 and a common alarm circuit in EAX 11 for activating the latter under alarm conditions described below. This alarm circuit is shared by a plurality of interface circuits and hence is termed a common alarm circuit.

Figure 2:
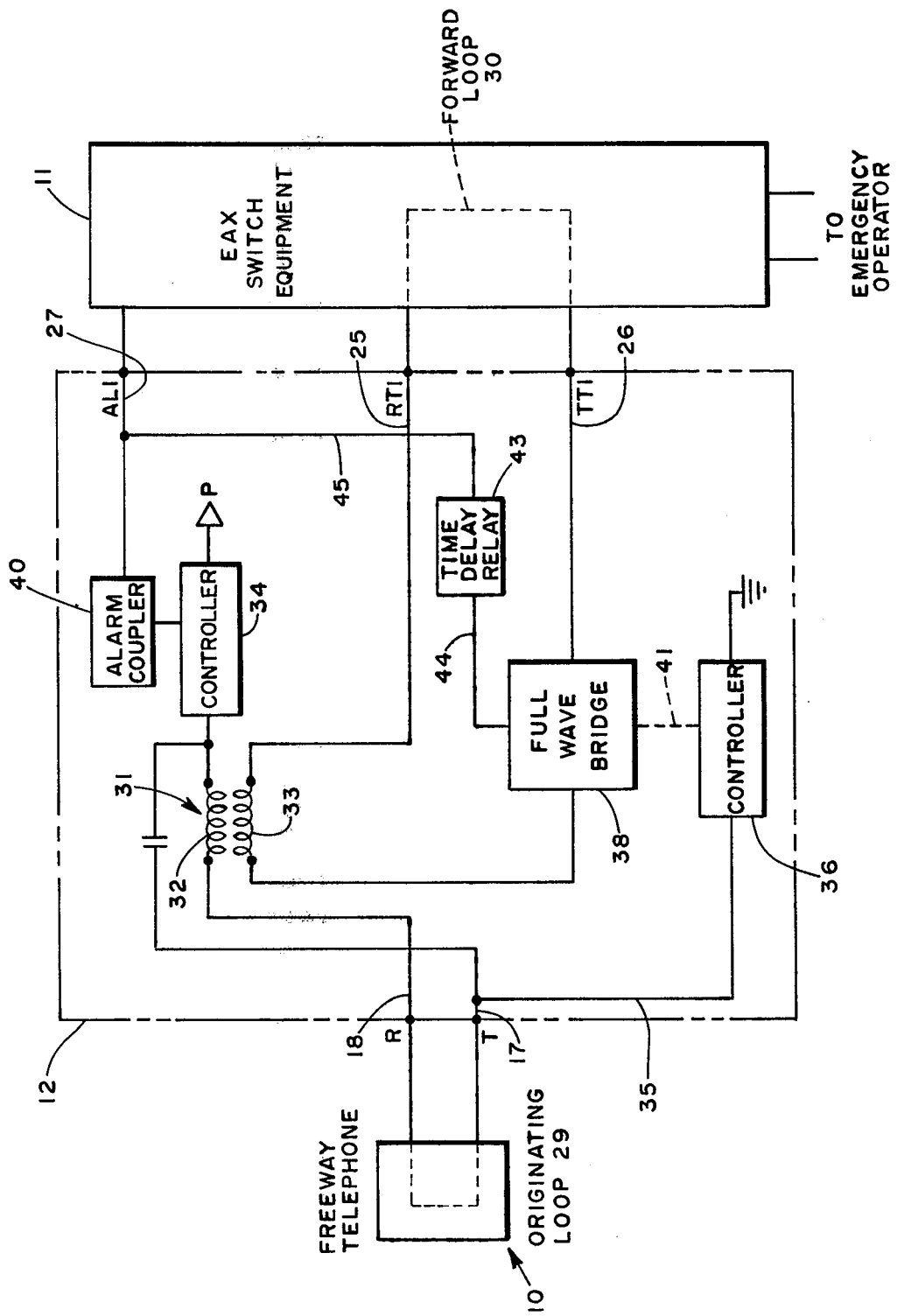
FIG. 2 is a block diagram showing details of the interface circuit embodying this invention.

Referring to FIG. 2, interface circuit 12 is shown in block diagram and comprises a first d-c network connected to the originating loop, designated 29, of the freeway telephone 10 by lines 17 and 18 and a second d-c network connected by lines 25 and 26 to forward loop 30 in EAX equipment 11. The two networks are a-c coupled by a transformer 31 having a first coil 32 and a second coil 33. The first d-c network comprises a power supply P, such as a battery, connected in series with a controller 34, first transformer coil 32, line 18 to originating loop 29, line 17 from the originating loop to controller 36 and to ground. The other d-c network is connected in series with forward loop 30 and comprises line 25 connected in series with the second coil 33, a full wave bridge 38 and line 26 to the other side of the forward loop. Controller 34 is connected to an alarm coupler 40 which energizes the common alarm in EAX 11 via line 27 if the flow of current in the originating loop ceases as, for example, when the telephone is ripped out. Controller 36 is operatively connected to bridge 38 as indicated by broken line 41 for activating the bridge when the freeway telephone is in the off-hook state and connecting coil 33 to forward loop 30. Bridge 38 monitors the on-hook and off-hook states of the emergency operator telephone in relation to those of the freeway telephone and energizes a time delay relay 43 via line 44 when the freeway phone remains off-hook after the emergency operator goes on-hook following the emergency call. After a suitable delay interval, for example 15 seconds, relay 43 via lines 45 and 27 causes the common alarm in the EAX to be activated to indicate this alarm condition.

Figure 3:
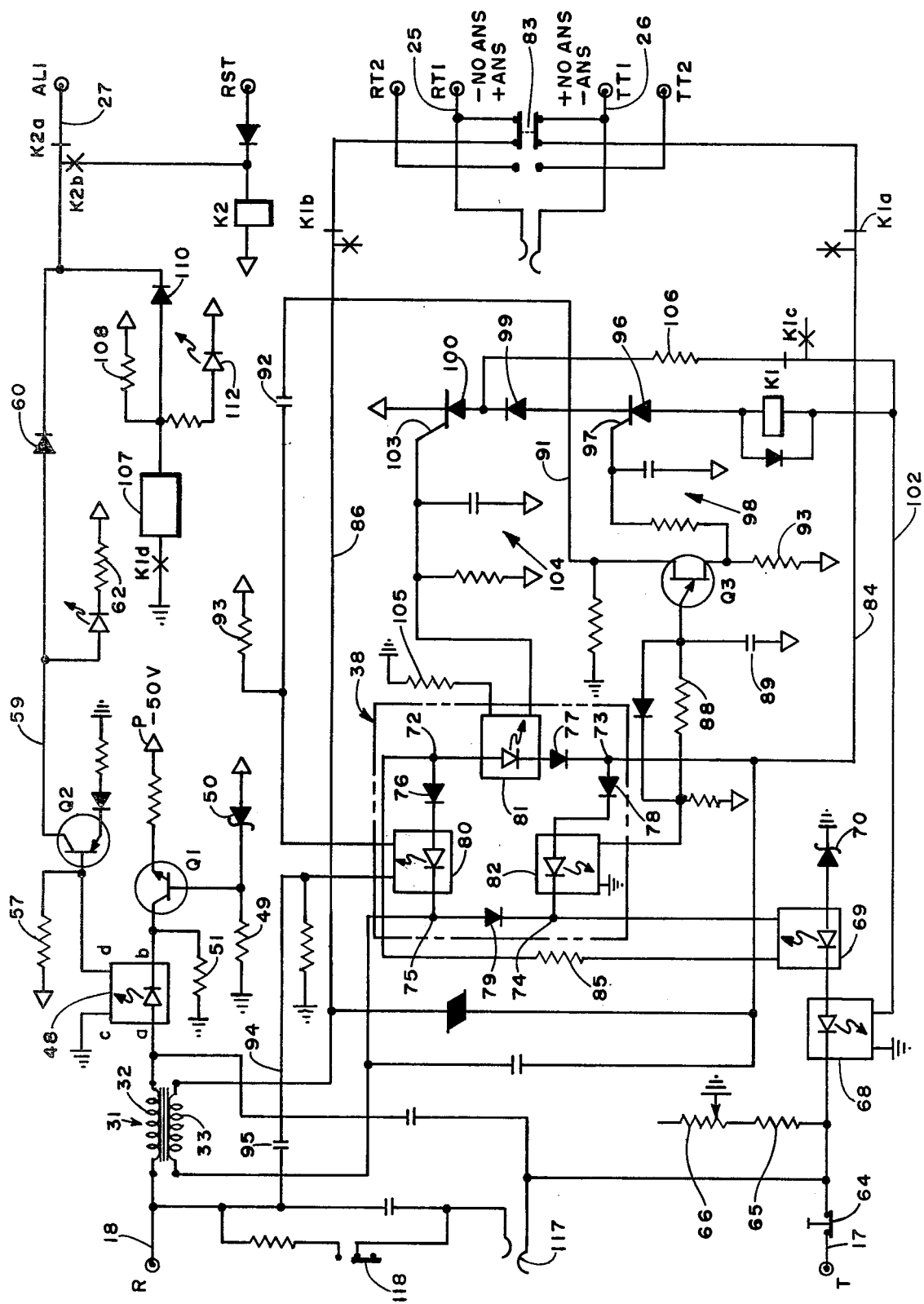
FIG. 3 is a diagram of the interface circuit.

Referring now to FIG. 3, originating loop 29 is monitored by a circuit comprising a current responsive to isolating switch 48 connected at port a through coil 32 of transformer 31 to line 18 and through port b and transistor Q1 to a power source indicated by the triangle, preferably a −50 volt d-c power supply. The triangle symbol used as the termination of a line throughout this circuit indicates connection to the −50 volt power supply. The base of transistor Q1 is forward-biased by ground through resistor 49 and is connected to the power supply through zener diode 50 selected to limit current at the transistor collector to a predetermined value, such as 50 mA. The collector of transistor Q1 is also connected to ground through resistor 51 for the purpose of suppressing noise.

Isolating switch 48 is illustrated in slightly greater detail in FIG. 4 and comprises a light emitting diode 53 having an anode 54 connected to port a and a cathode 55 connected to port b. Switch 48 also comprises a normally open switching element 56 connected to ports c and d and responsive to the light emitted by diode 53 to close the contacts of the element and thus complete the circuit between ports c and d. Switching element 56 is a photosensitive transistor. Switch 48 is a commercially available integrated circuit component, an example of which is Model MCA 255 opto-isolator manufactured by Monsanto Chemical Company. This type of switch is used in other parts of the circuit as described below and operates in the same manner. Use of such isolating switches in the interface circuit and especially in the forward loop as described below permits isolation of that loop from the power supply and from ground, thus assuring noise immunity and enhancing performance of the circuit.

Referring to FIG. 3, port c of switch 48 is connected to ground and port d is connected to the base of transistor Q2 and through resistor 57 to the power supply. The emitter of transistor Q2 is connected through a resistance to ground and its collector electrode is connected to line 59 with current flowing in the originating loop through switch 48 so that when the latter is closed, the base of Q2 is grounded so as to reverse bias Q2 and prevent conduction through it and block connection of line 59 to ground through the emitter. When current does not flow in the originating loop, switch 48 opens, Q2 conducts and line 59 is grounded. Line 59 is connected through diode 60, normally closed contact K2a of relay K2 and line 27 to terminal AL1 and the common alarm circuitry in the EAX. The function of relay K2 is explained below. A light emitting diode 62 is connected in series with the power supply and line 59 between transistor Q2 and diode 60 and is adapted to be energized to give visual indication of an alarm condition resulting from an opening of the originating loop.

The other side of the originating loop is connected to the T line 17 of the interface circuit through a momentary or non-locking pushbutton switch 64, resistor 65, and potentiometer 66 to ground. Switch 64 is also connected to isolating switches 68 and 69, which are identical to switch 48, through a zener diode 70 to ground. Switch 69 and zener diode 70 comprise the controller 36 shown in FIG. 2. Potentiometer 66 is adjusted to control the flow of current through the originating loop from the current limiter Q1 so that the voltage at the zener diode 70 is slightly below threshold thereby minimizing the flow of current through isolating switches 68 and 69 when the circuit is idle.

For the sake of simplifying the drawings, the reference characters on the ports of isolating switches 68, and others identified below, are omitted.

The flow of current through the originating loop is traced as follows: from the power supply through limiter Q1, isolating switch 48, coil 32 of transformer 31, line 18, diode 20 (see FIG. 1), resistor 19 (assuming an on-hook condition), transmitter-receiver 16, T line 17, resistor 65 and potentiometer 66 to ground. If the originating loop is opened for any reason, as when the telephone is ripped out, current flowing through the loop ceases, causing deactivation of switch 48, conduction through transistor Q2 by elimination of the reverse bias thereon, and thereby providing ground through Q2 on line 59 so as to cause energization of the common alarm circuit in the EAX. This action also causes diode 62 to be energized for indicating this alarm state.

When the freeway telephone goes from the on-hook to the off-hook state, hook switch contact 21 (see FIG. 1) closes causing shunt 22 to bypass resistor 19 and diode 20, thereby reducing the resistance in the originating loop. This increases the flow of current in the loop, raising the voltage across zener diode 70 above its threshold and causing it to conduct so as to provide a current path through switches 68 and 69, energizing the latter and connecting the switch element ports of each.

Bridge 38 is enclosed within the broken line rectangle in FIG. 3 and comprises four branches connected at junctions 72, 73, 74 and 75 and having diodes 76, 77, 78 and 79, respectively. Isolating switches 80, 81 and 82 which are identical to switch 48, are connected in three branches, respectively, of the four, namely, in series with diodes 76, 77 and 78, respectively. The anodes of diodes 76 and 77 are connected to junction 72 and the cathodes of diodes 78 and 79 are connected to junction 74. Thus the bridge is polarity sensitive.

The forward loop in the EAX is energized by a d-c power supply and is controlled in such a manner that there is a polarity reversal on the loop when the called party (operator) answers. In the particular EAX equipment used with this system, the polarities of RT1 line 25 and TT1 line 26 are negative and positive, respectively, when the operator is on-hook, and are reversed when the operator answers.

When the subscriber goes off-hook, bridge 38 is activated as described above and responds to the on-hook polarity status of the forward loop by actuation or closing of switches 80 and 82 in the bridge while switch 81 remains inactive or open. The current path from forward loop line 26 (positive) before The operator answers is through manual non-locking switch 83, relay contact K1a, line 84 to bridge junction 73, through diode 78, switch 82 (to actuate it), switch 69, resistor 85, junction 72, diode 76, switch 80 (to actuate it), junction 75, coil 33, line 86, relay contact K1b, switch 83 and to line 25.

With switch 82 of bridge 38 on, ground is connected through that switch to a network comprising resistor 88 and capacitor 89 to a uni-junction transistor Q3 which functions as a bistable circuit which alternates between conducting (on) and non-conducting (off) states at a rate controlled by resistor 88 and capacitor 89. For example, the values of these components may be selected to provide predetermined on-off times of 220 mS each for the transistor. Operation of bistable transistor Q3 has two effects. The transistor base-two is connected by line 91 to capacitor 92 which is charged and discharged via the power supply and resistor 93 connected to the transistor base-one at the on-off rate of transistor Q3 to generate a tick-tone signal (approx. 2 Hz for the 220 mS cycle). Capacitor 92 is connected through switch 80 of bridge 38 to R line 18 of the originating loop via line 94 and capacitor 95. This tick-tone signal thus provides an indication to the subscriber that the circuit is operative.

The other effect of the operation of transistor Q3 is to turn on, after a delay determined by resistor 88 and capacitor 89, a silicon controlled rectifier (SCR) 96 having a trigger electrode 97 connected to the base-one of transistor Q3 by the resistor-capacitor network 98. The cathode of SCR 96 is connected through diode 99 to the anode of SCR 100, the cathode of which is connected to the negative terminal of the power supply. The anode of SCR 96 is connected to one terminal of a relay K1, the other terminal of which is connected to ground through line 102 and switch 68. While rectifier 96 is alternately triggered to the "on" state by transistor Q3, it does not conduct unless rectifier 100 is likewise conducting at the same time. Trigger electrode 103 of SCR 100, biased to hold the latter in the non-conducting state by network 104, is connectable to ground through switch 81 of bridge 38 and resistor 105. When switch 81 closes, the SCR 100 is triggered to the "on" state and conducts to ground through resistor 106, normally closed contact K1c, line 102 and switch 68. SCR 100 continues to conduct as long as switch 68 is on. Thus the circuit condition which causes SCR 100 to conduct is when the subscriber and operator are off-hook.

Recapping the state of the interface circuit with the freeway telephone in the off-hook condition and prior to an answer received from the emergency operator, isolating switches 48, 68 and 69 are turned on and monitor the condition of the originating loop. With switch 69 on, switches 80 and 82 of bridge 38 are likewise turned on and the bridge monitors the polarity status of the forward loop. When switch 82 is energized, transistor Q3 begins to oscillate and capacitor 92 generates a tick-tone signal which passes to the earphone of the freeway telephone. Switch 81 in the bridge remains off so that SCR 10 does not conduct thereby preventing energization of relay K1 through SCR 96.

Energization of relay K1 in addition to opening contacts K1a, K1b and K1c also closes normally open contact K1d connecting one lead of a time-delay device 107 to ground. The other lead of device 107 is connected via resistor 108 to the d-c power supply and through diode 110 to common alarm line 27. When relay contact K1d closes, device 107 is energized and, after a predetermined time interval such as 15 seconds, connects line 27 to ground to energize the common alarm. In addition, a light emitting diode 112 connected between the power supply and device 107 is energized when the latter conducts to give visual indication of the alarm condition caused by the freeway telephone being off-hook for more than 15 seconds after the emergency operator goes on-hook.

Provision is made for releasing the common alarm circuit for general availability to other circuits. A momentary non-locking reset switch, not shown, is connected to terminal RST, see FIG. 3, and when depressed applies a ground to this terminal and to relay K2. The grounding of RST energizes relay K2 causing contact K2a to open thereby disconnecting the interface circuit from the common alarm which returns to its idle status and is available for actuation by any one of the plurality of other circuits which it services. Contact K2b closes and applies ground from Q2 to relay K2 which then remains energized as long as the alarm condition in this interface circuit continues. LED 62 or 112 remains energized under these circumstances until that alarm condition is corrected.

Jack 114 provides the technician with convenient access to the emergency operator through the EAX for testing and checking purposes. Switch 83 permits connection of coil 33 of transformer 31 to another non-dial EAX line via terminals RT2 and TT2 for testing purposes. Jack 117 is also used for testing purposes permitting a test telephone inserted into it to be a-c coupled to transformer coil 32 to function as a substitute for the freeway telephone. When switch 118 adjacent to jack 117 is closed, the test telephone is connected directly into the originating loop with isolating switch 48 for the purpose of testing the loop alarm circuitry. Preferably switches 83 and 117 are ganged together so that tests by the telephone in jack 117 are conducted by placing local calls through terminals RT2 and TT2. Switch 64 is useful to open the originating loop for testing the alarm circuitry through isolating switch 48 and transistor Q2.

The operation of this circuit will now be described in conjunction with the functional flow diagrams of FIGS. 5, 6 and 7. In these diagrams "x" means connect and "-" means disconnect. Assume the circuit is idle with current flowing through the originating loop and for some reason (vandalism, accident, etc.) that loop is opened. This causes the cessation of current flow in the loop which disconnects isolating switch 48, removing the negative bias from Q2 and allowing it to conduct. This connects the ground on the emitter of Q2 to line 59 connected to the common alarm terminal AL1 to energize the common alarm. LED 62 is also grounded through Q2 and gives a visual indication of the alarm condition. When the common alarm circuit is disconnected by grounding of the RST terminal, diode 62 continues to glow.

Assume the interface circuit is idle and the freeway telephone is removed from its hook as suggested in FIG. 6. This causes the shunt 22 to be connected in the originating loop, increasing current in the loop so that the threshold of zener diode 70 is exceeded and providing a current path through isolating switches 68 and 69 which then close. When the switching element of switch 69 closes, bridge 38 is connected in the d-c network which includes forward loop 30 thereby causing the EAX to outpulse the number of the emergency operator. The closing of switch 69 also causes switches 80 and 82 in the bridge to close and, after a 200 mS delay, causes transistor Q3 to turn on and off resulting in the charging and discharging of capacitor 92 which applies an audio signal to the originating loop.

Next assume that the distant operator answers in response to outpulsing of the EAX, as illustrated in FIG. 7. The reversal of polarity on the TT1 and RT1 terminals causes switches 82 and 80 of the bridge to disconnect and switch 81 to connect, thereby applying a trigger voltage to the SCR 100 so that it conducts through switch 68 to ground. SCR 100 remains on as long as switch 68 is on.

Next assume the subscriber disconnects prior to the operator. This reduces the current in the originating loop and causes switches 68 and 69 to open thereby disconnecting switch 81 in the bridge and turning off SCR 100. The circuit is thus returned to the idle state.

Assume that the operator disconnects prior to the subscriber. Switch 81 of the bridge is disconnected and switches 82 and 80 are reconnected. After a 220 mS delay, as indicated by the broken line, transistor Q3 is turned on which causes SCR 96 to conduct. Since SCR 100 is also conducting at this time, there is now a current path through SCR 96 and relay K1 to ground through switch 68. Energization of relay K1 closes contact K1d to begin the 15-second delay cycle of device 107. At the end of that delay interval, device 107 closes which applies the ground connected thereto to common alarm terminal AL1 and to the LED 112 for indicating the alarm condition. The energization of K1 also opens relay contacts K1a and K1b to disconnect the forward loop from the circuit.

Assuming that the subscriber disconnects, i.e., goes on-hook, during the 15-second delay interval of device 107, switches 68 and 69 are disconnected and in turn disconnect SCR 100 and SCR 96, causing deenergization of relay K1 and disabling of device 107. The circuit is thus returned to the idle state.

What is claimed is:

1. A circuit for interconnecting a call-originating loop containing a non-dial telephone instrument and a forward loop in automatic electronic switch equipment capable of automatically outpulsing the number of an emergency operator in response to a change in operating state of said instrument from the on-hook to off-hook condition, said originating loop providing a continuous d-c path having different resistances when said instrument is in the on-hook and off-hook conditions, respectively, each of said loops having two inlet lines, the inlet lines of said forward loop having a d-c voltage thereon with a predetermined polarity, said forward loop having means for changing the polarity of said inlet lines thereof from a first polarity state before the operator answers the call from the originating loop instrument to a second polarity state when the operator answers such call, said circuit comprising a transformer having first and second a-c coupled windings,
means to connect said inlet lines of said originating loop across said first winding,
means to connect said inlet lines of said forward loop across said second winding comprising
bridge means connectable in an operating state in series between said second winding and one of said inlet lines of said forward loop, and
controller means adapted to connect and disconnect said bridge means into and from said operating state,
a source of d-c current, and
means to connect said d-c source to one of said originating loop inlet lines whereby to cause direct current to flow in the originating loop,
said controller means being responsive to the magnitude of current in said originating loop when said instrument is off-hook for connecting said bridge means into the operating state and operatively connecting said second winding to the inlet lines of said forward loop.

2. The circuit according to claim 1 including an audio signal generator, said bridge means having first and second switch means responsive to the first polarity state of said forward loop inlet lines for actuating said generator and connecting same to said originating loop and for disconnecting same when the forward loop inlet lines are in the second polarity state.

3. The circuit according to claim 2 in which said bridge means has third switch means responsive to the second and first polarity states of said forward loop inlet lines whereby to be operative and inoperative, respectively,
first control means connected to said third switch means and adapted to be actuated when said third switch means is operative,
means for retaining said control means in the actuated state while said instrument is off-hook,
alarm means,
means to energize said alarm means,
relay means operatively connecting said alarm means and said energizing means, and
second control means responsive to operation of said first switch means and to simultaneous actuation of said first control means to energize said relay means and thereby energize said alarm means.

4. The circuit according to claim 3 including means for delaying energization of said alarm means after energization of said relay means.

5. The circuit according to claim 3 in which said retaining means comprises fourth switch means responsive to current in said originating loop for retaining said first control means in the actuated state.

6. The circuit according to claim 1 in which said bridge comprises
first, second, third and fourth branches connected in loop series at four junctions, respectively,
each branch having a diode with a positive and negative terminal,
the first and second branches being adjacent and having a first common junction connected to the negative terminal of the diode in the first branch and to the positive terminal of the diode in the second branch,
the third and fourth branches being adjacent and having a second common junction connected to the positive terminal of the diode in the third branch and to the negative terminal of the diode in the fourth branch,
said inlet lines of said forward loop being connected to said first and second junctions, respectively,
said second and fourth branches each having switch means in series between said forward loop and said second winding and adapted to be actuated by current in the second and fourth branches prior to answering by the operator whereby to connect the forward loop to said second winding.

7. The circuit according to claim 6 in which said diode in said first branch is connected in series between said forward loop and said second winding in response to reversal of polarity on the inlet lines of said forward loop after answering by the operator whereby to connect the forward loop to said second winding, said switch means in said second and fourth branches being deactuated in response to said forward loop polarity reversal.

8. The circuit according to claim 7 in which said first branch has switch means adapted to be actuated by current in said first branch, first control means connected to and actuated by said first branch switch means, second control means connected to and actuated by the second branch switch means and by said first control means, means responsive to the off-hook state of the telephone in the originating loop for maintaining said first control means in the actuated state independent of said first branch switch means, and alarm means connected to said second control means and operative by simultaneous actuation of the first and second control means to indicate an alarm condition.

9. A circuit for interconnecting a call-originating loop containing a non-dial telephone instrument and a forward loop in automatic electronic switch equipment capable of automatically outpulsing the number of an emergency operator in response to a change in operating state of said instrument from the on-hook to off-hook condition, said originating loop providing a continuous d-c path having different resistances when said instrument is in the on-hook and off-hook conditions, respectively, each of said loops having two inlet lines and a d-c power supply connected thereto, means for changing the polarity of said inlet lines of said forward loop from a first polarity state when the operator is on-hook to a second polarity state when the operator is off-hook, said equipment having common alarm means, said circuit comprising a first d-c network comprising said originating loop,
a second d-c network comprising said forward loop,
means to a-c couple said networks,
means responsive to current in said first network for enabling and said disabling said second network,
relay means connected to said alarm means and operable to actuate same,
first and second control means connected to said relay means and actuatable simultaneously to operate said relay means,
means responsive to said first polarity state of said second network for actuating said first control means,
means responsive to current in the originating loop for maintaining actuation of said first control means when said instrument is off-hook, and
means responsive to the second polarity state of said second network for actuating said second control means whereby said relay means is operated and said alarm means is actuated when said telephone instrument is off-hook and said second network has returned from the second polarity state to the first polarity state.

10. The circuit according to claim 9 with means for delaying actuation of said alarm means after operation of said relay means.

* * * * *